United States Patent [19]
Freel et al.

[11] Patent Number: 5,792,340
[45] Date of Patent: Aug. 11, 1998

[54] METHOD AND APPARATUS FOR A CIRCULATING BED TRANSPORT FAST PYROLYSIS REACTOR SYSTEM

[75] Inventors: Barry A. Freel, Greely; Robert G. Graham, Nepean, both of Canada

[73] Assignee: Ensyn Technologies, Inc., Ontario, Canada

[21] Appl. No.: 420,376

[22] Filed: Apr. 7, 1995

Related U.S. Application Data

[63] Continuation-in-part of Ser. No. 299,820, Sep. 1, 1994, abandoned, which is a continuation of Ser. No. 917,066, filed as PCT/CA91/00022, Jan. 30, 1991, abandoned.

[30] Foreign Application Priority Data

Jan. 31, 1990 [CA] Canada .................... 2009021

[51] Int. Cl.$^6$ .................... C10G 9/32
[52] U.S. Cl. .................... 208/127; 208/126; 208/410; 585/240; 585/241; 585/242; 201/12; 201/21; 201/23; 201/24
[58] Field of Search .................... 585/240, 241, 585/242; 208/113, 126, 127, 410; 201/12, 21, 23, 24

[56] References Cited

U.S. PATENT DOCUMENTS

| | | | |
|---|---|---|---|
| 2,573,906 | 11/1951 | Huff | 208/410 |
| 2,735,804 | 2/1956 | Boston et al. | 208/127 |
| 3,853,498 | 12/1974 | Bailie | 201/12 |
| 4,039,390 | 8/1977 | Logan | 201/12 |
| 4,064,018 | 12/1977 | Choi | 208/410 |
| 4,083,751 | 4/1978 | Choi et al. | 202/99 |
| 4,085,030 | 4/1978 | Green et al. | 208/410 |
| 4,087,347 | 5/1978 | Langlois et al. | 208/408 |
| 4,102,773 | 7/1978 | Green et al. | 201/28 |
| 4,106,999 | 8/1978 | Koppelman et al. | 202/118 |
| 4,108,732 | 8/1978 | Nuttall, Jr. | 201/22 |
| 4,147,593 | 4/1979 | Frischmuth et al. | 201/21 |
| 4,153,514 | 5/1979 | Garrett et al. | 201/2.5 |
| 4,260,456 | 4/1981 | Schulman | 201/12 |
| 4,280,876 | 7/1981 | Green | 201/9 |
| 4,298,453 | 11/1981 | Schoennagel et al. | 208/408 |
| 4,322,222 | 3/1982 | Sass | 48/197 R |
| 4,507,195 | 3/1985 | Spars et al. | 208/410 |
| 4,693,808 | 9/1987 | Dewitz | 208/113 |
| 5,092,984 | 3/1992 | Babu et al. | 208/409 |
| 5,136,117 | 8/1992 | Paisley et al. | 585/241 |
| 5,326,919 | 7/1994 | Paisley et al. | 585/241 |

FOREIGN PATENT DOCUMENTS

| | | |
|---|---|---|
| 932686 | 8/1973 | Canada . |
| 1050736 | 3/1979 | Canada . |
| 1090732 | 12/1980 | Canada . |
| 1108545 | 9/1981 | Canada . |
| 1283880 | 5/1991 | Canada . |

OTHER PUBLICATIONS

Textbook Excerpt, Occidental Flash Pyrolysis, pp. 285–286, Rockwell Flash Pyrolysis, pp. 286–287 (No Date).

G. R. Gavalas, Coal Pyrolysis, pp. 70–76, 1982, Amsterdam (No Month).

C. L. Oberg et al., Coal Liquefaction by Flash Hydropyrolysis, pp. 159–165, 1980, California (No Month).

(List continued on next page.)

*Primary Examiner*—Walter D. Griffin
*Attorney, Agent, or Firm*—Brinks Hofer Gilson & Lione

[57] ABSTRACT

This invention generally relates to a new method and apparatus for the fast pyrolysis of carbonaceous materials involving rapid mixing, high heat transfer rates, precisely controlled short uniform residence times and rapid primary product quench in an upflow, entrained-bed, transport reactor with heat carrier solids recirculation. A carbonaceous feedstock, a non-oxidative transport gas and inorganic particulate heat supplying material are rapidly mixed in a reactor base section, then transported upward through an entrained-bed tubular reactor. A cyclonic hot solids recirculation system separates the solids from the non-condensible gases and primary product vapors and returns them to the mixer. Product vapors are rapidly quenched to provide maximum yields of liquids, petrochemicals, high value gases and selected valuable chemicals.

24 Claims, 8 Drawing Sheets

OTHER PUBLICATIONS

D. A. Berg et al., Characterization of Solids Mixing in an Ultra–Rapid Fluidized Reactor, 1986, Illinois (No Month).

D. A. Berg et al., Rapid Mixing Studies Between Transported Solids in an Ultra–Rapid Fluidized Reactor, 1985, Illinois (No Month).

J. J. Fritz et al., Status Review of Wood Biomass, Gasification, Pyrolysis, and Densification Technologies, pp. 66–67, Jan., 1979.

Symposium Papers Excerpt, Energy from Biomass and Wastes IV, p. 25, Jan., 1980, Florida.

Symnposium Papers Excerpt, Energy From Biomass and Wastes V, p. 41, Jan., 1981, Florida.

B. H. Levelton et al., An Evaluation of Wood Waste Energy Conversion Systems, pp. 5–62, December, 1980, Vancouver, B.C.

A. Serper, Solids Wastes Management Journal, "Resource Recovery Field Stands Poised Between Problems, Solutions", pp. 16, 86, May, 1980.

N. W. Sorbo et al., Technical and Economic Feasibility of Small Scale Co–Gasification of Densified Sludge and Solid Waste Symposium Papers Excerpt, Energy From Biomass and Wastes VI, pp. 587, 596 Jan., 1982, Florida.

S. T. DiNovo et al., Preliminary Assessment of Biomass Conversion to Synthetic Fuels, pp. 123–127, Oct., 1978, Ohio.

G.T. Preston, Resource Recovery and Flash Pyrolysis of Municipal Refuse, pp. 1–28, Dec., 1975, California.

C. Bliss et al., Silvicultural Biomass Farms, vol. V, Conversion Processes and Costs, p. 60, May, 1977.

LIQUID YIELD VS SOLIDS LOADING

METHOD AND APPARATUS FOR A CIRCULATING BED TRANSPORT FAST PYROLYSIS REACTOR SYSTEM

This is a continuation-in-part of application Ser. No. 08/299,820, filed Sep. 1, 1994, now abandoned, which is a continuation of application Ser. No. 07/917,066, filed Jul. 30, 1992, now abandoned, which is based on PCT International Application PCT/CA91/00022, filed Jan. 30, 1991.

FIELD OF THE INVENTION

This invention generally relates to a new method and apparatus for the fast pyrolysis of carbonaceous materials involving rapid mixing, high heat transfer rates, precisely controlled short uniform residence times and rapid primary product quench in an upflow, entrained-bed, transport reactor with inorganic heat carrier solids recirculation.

BACKGROUND OF THE INVENTION

The processing of carbonaceous feedstocks to produce heat, chemicals or fuels can be accomplished by a number of thermochemical processes. Conventional thermochemical processes, such as combustion, gasification, liquefaction, and conventional pyrolysis are typically equilibrium processes and yield relatively low-value equilibrium products including major quantities of non-reactive solids (char, coke, etc.), secondary liquids (heavy tars, aqueous solutions, etc.), and non-condensible gases ($CO_2$, CO, $CH_4$, etc.). For example, combustion is restricted to immediate thermal applications, and gasification normally produces low energy fuel gas with limited uses. Liquefaction and conventional pyrolysis often produce low yields of valuable liquid or gaseous products. In addition the liquid products which are produced often require considerable secondary upgrading.

Pyrolysis is characterized by the thermal decomposition of materials in the relative absence of oxygen (i.e., significantly less oxygen than required for complete combustion). Typically, pyrolysis has historically referred only to slow conventional pyrolysis whose equilibrium products included roughly equal proportions of non-reactive solids (char and ash), secondly liquids, and non-condensible gases.

However, over the past two decades fundamental pyrolysis research has unexpectedly indicated that high yields of primary, non-equilibrium liquids and gases (including valuable chemicals, chemical intermediates, petrochemicals and fuels) could be obtained from carbonaceous feedstocks through fast (rapid or flash) pyrolysis at the expense of undesirable, slow pyrolysis products. In other words, the low-value product distribution of traditional slow pyrolysis can be avoided by the approach embodied by fast pyrolysis processes.

Fast pyrolysis is a generic term that encompasses various methods of rapidly imparting a relatively high temperature to feedstocks for a very short time, then rapidly reducing the temperature of the primary products before chemical equilibrium can occur. By this approach the complex structures of carbonaceous feedstocks are broken into reactive chemical fragments which are initially formed by depolymerization and volatilization reactions, but do not persist for any significant length of time. Thus, non-equilibrium products are preserved, and valuable, reactive chemicals, chemical intermediates, light primary organic liquids, specialty chemicals, petrochemicals, and/or high quality fuel gases can be selected and maximized at the expense of the low-value solids (char, coke, etc.), and heavy secondary organic liquids (tars, creosotes, etc.).

Fast pyrolysis is an intense, short duration process that can be carried out in a variety of reactor systems. The common aspect of these reactors is the ability to achieve extremely rapid feedstock heating with limitation of the reaction to relatively short times by rapid cooling which stops the chemical reactions before the valuable intermediates can degrade to non-reactive, low-value final products. A fast pyrolysis process reactor system must therefore be characterized by the following requirements:

1) A very rapid feedstock heating rate. Typically the heating rate lies within the range of 1,000° to 1,000,000° C. per second.

2) A controlled, elevated reaction temperature. Typically the reaction temperature lies within the range of 350° to 800° C.

3) A controlled, short reaction/residence time. Typically the residence time lies within the range of 0.03 seconds to 2 seconds.

4) A rapid product quench. Typically the products are quickly cooled below 350° C. within 0.5 seconds.

Furthermore, in a true fast pyrolysis system where liquids are the desired primary product, product data as characterized in Table 1 is typically obtained.

TABLE 1

| FAST AND SLOW PYROLYSIS CHARACTERIZATION | | |
|---|---|---|
| PROPERTIES | FAST* | SLOW |
| MASS YIELDS (%): | | |
| Oil/Tar | 75–90 | 15–40 |
| Aqueous Phase | 0 | 10–15 |
| Gas | 7–11 | 20–40 |
| Char | 3–14 | 20–35 |
| LIQUID PRODUCT: (Oil/Tar) | | |
| Phases | one | two |
| Viscosity (cp @ 40° C.) | 40–100 | 300 plus |
| Moisture (%) | 15–30 | 10 |
| Energy Content (MJ/kg) | 16–18 | 26 |
| Pour Point (C) | −23 | 32 |
| Acidity | strongly acidic | weakly acidic |
| Blendable in No. 2 Fuel Oil | no | unknown |

*References for the fast pyrolysis data represent several researchers using various fast pyrolysis techniques.

Accordingly, a true fast pyrolysis system, optimized for liquids production, is characterized by relatively high oil/tar yield, with no distinct aqueous phase yield, low gas yield and low char yield. Furthermore, a true fast pyrolysis system will yield a single liquid phase.

Past reactor systems have been limited to slow pyrolysis processes by a variety of factors including the selection of the heat carrier used to carry out the rapid heating of the process and by carrying out the process at too low loading ratios of particulate heat carrying material to feedstock. For example, past processes have relied upon organic heat carriers, such as hot char to provide the desired feedstock heating rate. The use of organic heat carriers results in primarily non-contact radiation and convection heat transfer as opposed to the more desirable ablative heat transfer and thereby results in a slow pyrolysis process.

REVIEW OF PYROLYSIS REACTORS

Four basic types of reactor systems have been investigated as to their applicability to fast pyrolysis process development. These include; fluidized-bed reactor, transport reactor, cyclonic ablative reactor and vacuum pyrolysis reactors.

Fluidized-beds

Although a fluidized-bed achieves rapid heating rates and a controlled elevated temperature, it is limited by a relatively long average residence time that is beyond the optimal levels for maximum yields of liquids and certain valuable chemicals and petrochemicals. Extensive back-mixing is inherent in this type of fluidized-bed and contributes to a broad residence time distribution and poor control of product selectivity.

Progress in the fast pyrolysis of coal led to the application of shallow bubbling fluidized-beds to reduce the average residence time and thereby more closely approach maximum yields of liquids, petrochemicals and valuable chemicals.

This reactor system fulfills the requirement of rapid heating rate, controlled elevated temperature, and relatively short average residence time; however, a major limitation of the shallow bubbling fluidized-bed reactor, centres on the inability to effectively achieve economical scale-up to industrial applications. While a fluidized-bed can be scaled-up, the requirement for acceptable fluidization properties requires a corresponding scale-up of the bed depth which does not allow the specific short average residence time to be maintained. Another major limitation of the shallow bubbling fluidized-bed is that the minimum average residence time possible can be no less than about 0.5 seconds.

Secondary factors also constrain the achievement of optimum fast-pyrolysis conditions. Very limited ablation occurs in the shallow bubbling bed, and back-mixing, while considerably reduced from that inherent in a deep fluidized-bed, is still sufficient to produce a significant residence time distribution.

Transport Reactors

Four general types of transport reactors have been applied to the fast pyrolysis of carbonaceous feedstocks. They are defined according to the nature of the transporting medium which can be gas or gas plus solids and by the direction of flow through the reactor, which can be upflow or downflow. The majority of transport reactors in more advanced levels of scale-up or commercialization typically employ a gas stream only to transfer heat to the reactants.

Major drawbacks associated with these reactor systems include; poor mixing of feedstock and heat carrier, essentially no particle ablation, and poor heat transfer to the reacting particles.

Poor heat transfer and limited ablation result from the use of only a gas as the conveying and heat transfer medium. In addition, the poor heat transfer limitations of the upflow transport gas reactor system precludes operating at the very short residence times required for optimizing yields of total liquids, petrochemicals and desirable chemical products.

All of the drawbacks previously mentioned for the upflow reactor systems also apply to this reactor configuration, which limits potential for achieving high total liquid yields and selective yields of petrochemicals and valuable chemicals.

To improve heat transfer in transport reactors, a solid organic heat carrier has been utilized.

An example of a past system utilizing an organic heat carrier is disclosed in U.S. Pat. No. 4,153,514. In this patent, the use of an organic heat carrier (hot char) is disclosed. The organic heat carrier of this patent does not provide the thermal, physical and chemical properties alone for a highly effective and efficient pyrolysis reaction in that the char material does not provide the heat demand, surface area for intimate contact, the rapid heat transfer between the heat carrier and feedstock and the physical strength for efficient and practical pyrolysis. Furthermore, the char participates in the reaction and is, therefore, being consumed and converted into undesirable side products, which means that even less heat carrier is available for heat transfer as the char proceeds through the reaction zone and lower yields of the desired products. More importantly, due to the characteristics of char, a sufficiently high loading ratio to achieve fast pyrolysis is not possible.

Furthermore, this patent does not disclose product consistent with a true fast pyrolysis process, that is maximum yield of high quality, primary condensible liquid.

More recently, a Rapid Thermal Process (RTP), downflow, tubular reactor has been developed as described in Canadian Patent Application 536,549 which overcomes many of the drawbacks associated with the transport reactors discussed above. This system makes use of an inert or catalytic solid particulate heat carrier to carry and transfer heat to the process.

This reactor configuration provides an extremely rapid heating rate and excellent particle ablation as a result of direct turbulent contact between the heat carrier solids and the inorganic particulate reactants. The utilization of a tubular downflow section after the separate rapid mixer ensures minimal back-mixing and allows precise control of a broad range of very short, uniform residence times with minimal residence time distribution.

One drawback associated with this reactor configuration is the lack of a practical process to recirculate the inorganic particulate solid heat carrier from the base of the reactor up to the mixer.

Cyclonic Ablative Reactors

An alternative approach to achieving extremely high heat transfer rates, excellent particle ablation and minimal back-mixing involves a cyclonic or vortex tube reactor in which rapidly moving feedstock particles are forced into direct intimate continuous contact with the hot reactor wall.

The wall sweeps the primary depolymerization liquids from the reacting surface where they are immediately vaporized and carried to a quenching unit. This approach permits excellent control of a very short, and uniform residence time. Laboratory-scale and process development units have been operated on biomass feedstocks in the temperature range of 400°–900° C.

On a small scale, this reactor configuration meets most of the requirements for effective rapid pyrolysis. However, the potential for commercial application is minimal because of the inherent limitation of heat transfer rate through a reactor wall, extreme complexity associated with scale-up, and the general absence of commercial application of these reactors in the chemical and thermal process industries.

Vacuum Pyrolysis

Vacuum pyrolysis is a special case of fast pyrolysis. The very rapid heat transfer typically associated with the previously noted fast pyrolysis process is not required since operation under vacuum ensures that primary depolymerization liquids at the surface of the reacting particles are rapidly drawn from the surface and removed from the reaction zone before they degrade to less valuable secondary products (char, heavy tar, non-condensible gases).

Although relatively high liquid yields have been realized and the reactor configuration allows selective withdrawal of specific product fractions, there are obstacles associated with commercial implementation. The most serious of these are heat transfer limitations, the inherent difficulty associated with scale-up of vacuum processes, the potential for inadequate solids flow, and the general lack of demonstrated chemical conversion vacuum processes on an industrial scale.

None of the above reactors meet all of the requirements for a large-scale fast pyrolysis reactor, especially in so far as the product obtained and the requirement of scaling up the reactor to commercial size.

In addition, a practical, economical, commercial process requires:

1) Relatively high yields of the desirable products;
2) Scalability of the process to industrial size reactors;
3) Industrially practical operation (reasonable energy requirements, durability, process controllability, etc.).

Accordingly, there has been a need for a method and apparatus for a circulating bed transport fast pyrolysis reactor system providing true fast pyrolysis product and utilizing an inorganic heat carrier with its inherent ablative heat transfer properties to provide true fast pyrolysis.

In particular, there has been a need for a system and process that combines adequate reactor temperature, short residence time and rapid product cooling to achieve true fast pyrolysis with the required aspect of extremely rapid heat transfer to the feedstock particles. In order to effectively achieve sufficiently high heat transfer rates in a reactor system, direct ablative contact between the solid heat carrier (that is, the reactor wall or solid particles) and the feedstock is required. This type of heat transfer can only be accomplished in a reactor system if that system provides a relatively large amount of hot surface area to the reacting biomass, per unit time, per unit volume of reactor. If the heat transfer surface is relatively small, either the rate of heat transfer is reduced or the reactor can only process a relatively small amount of material per unit time per unit volume of reactor (with a significant negative effect on the economics of the reactor). Thus, there has been a need for a system that utilizes the high bulk density of an inorganic heat carrier to allow a high loading (mass of heat carrier to mass of feed) to be achieved in a relatively small reactor volume in order to provide a very large heat transfer surface to be available to the feed.

There has also been a need for a system and process that utilizes an inorganic heat carrier, such as sand or a catalyst, where the inorganic carrier has the physical strength to provide a continuing physical abrasion of the reacting feed thereby exposing fresh reacting surface for heat transfer and pyrolysis and does not participate in the pyrolysis reaction.

Furthermore, there has been a need for a method and apparatus for fast pyrolysis where the reactor is self-cleaning without plugging wherein a single phase of liquid yield is produced.

Furthermore, there has been a need for a fast pyrolysis apparatus where the contact angles between heat carrier and feedstock are optimized to enhance efficient mixing.

Furthermore, there has been a need for a fast pyrolysis apparatus where mixing at the feed and heat source does not occur substantially before their introduction to the actual pyrolysis conversion vessel (ie. reactor).

In summary, therefore, the following problems must be addressed and overcome if a fast pyrolysis reactor with solids recirculation is to be effectively applied to the fast pyrolysis of carbonaceous feedstocks:

1) a very short, uniform, controlled residence time;
2) extremely rapid, thorough mixing in the mixing section to ensure very high heat transfer rates;
3) adequate heat supply and transfer to the reaction zone via only the circulating particulate solid heat carrier;
4) avoidance of cyclone flooding while achieving minimum desirable reactor residence times;
5) a very high degree of particle ablation;
6) non-oxidative conditions in the reaction zone;
7) effective separation of the condensible vapour products from the heat carrier solids without loss of the condensed vapours to the solids recirculation stream;
8) cleaning and recycle of a portion of the non-condensible product gases for use as a transport medium;
9) prevention of pre-pyrolysis in the feed system;
10) prevention of plugging of the reactor at high loading ratios;
11) a reactor configuration that permits use of a sufficiently high ration of inorganic particulate heat carrier to feedstock.

SUMMARY OF THE INVENTION

This invention generally relates to a new method and apparatus for the fast thermal processing (such as fast pyrolysis, rapid cracking) of carbonaceous materials (feedstock) involving rapid mixing and heat transfer in a novel reactor design. The heat is transferred to the feedstock from hot inorganic particulate solids which are accelerated and then injected into the reactor through one or several streams, and impinge on one or several feedstock streams. The mixing section therefore combines the hot inorganic particulate solids and carbonaceous feedstock in a dense turbulent central stream in the mixing zone. Solids are accelerated at the base of and throughout the mixing zone to enhance turbulence and mixing.

The present invention comprises a process and apparatus for achieving efficient, rapid, practical thermal and/or catalytic processing of carbonaceous feedstocks. A distinct, turbulent, mixing zone achieves extremely rapid, effective mixing of a inorganic particulate feedstock with a solid inorganic particulate heat carrier and a non-oxidative transport gas. Direct turbulent contact between the solid heat carrier and the feedstock provides very high heat transfer rates and effective particle ablation which are required for depolymerization and devolatilization reactions that provide maximum total liquid yields.

High value chemical products, (chemicals, specialty chemicals, and petrochemicals), and fuel can be obtained if the process is enhanced and optimized by the achievement of the following additional requirements:

1) Ablation of the reacting particles. That is, a physical/mechanical mechanism that removes the primary depolymerization liquids from the reacting surface at a surface regression rate that is consistent with the thermal penetration rate. In effect, at an infinitesimal distance below the retreating reaction surface, the temperature remains far below the reaction temperature and very limited fragmentation, depolymerization or repolymerization reactions occur.
2) Minimal back mixing within the reactor. That is, there is very minimal internal recirculation (eddies) of the reactant, carrier gas, products or heat carrier solids within the reacting zone.
3) Precise control of a uniform short reactor residence time. This implies that the average residence time not only be short but that there be very limited or no residence time distribution about this average.
4) Control of the loading ratio of inorganic heat carrying particles to feedstock above 12:1.

In accordance with the present invention there is provided a process for the rapid thermal processing of carbonaceous material in a thermal process reactor, the reactor having a mixing section and a reactor section comprising the steps of:

a) introducing a primary stream of carbonaceous material and a secondary stream of upwardly flowing inorganic particulate heat supplying material into the mixing section in the relative absence of oxygen, the ratio of the mass of inorganic heat supplying material: mass of carbonaceous feedstock greater than 12:1;

b) maintaining the stream of carbonaceous material in contact with the secondary stream of heat supplying material through the reactor section to cause transformation of the carbonaceous material to a product stream;

c) separating the product stream from the heat supplying material by separation means at the exit of the reactor section such that the average residence time of contact between the carbonaceous material and the heat supply material is less than 2.0 seconds and the temperature of the products is reduced after exiting from the reactor section to less than 300° C. in less than 0.1 seconds;

d) recycling the heat supplying material to the mixing section.

In various embodiments of the invention, the inorganic particulate heat supplying material is sand, sand and catalytic solids, alumina-silica catalyst or other inorganic catalyst, the ratio of the mass of inorganic heat supplying material: mass of carbonaceous feedstock is between 12:1 and 200:1, the heating rate of the carbonaceous material in the mixing section and reactor section is greater than 1000° C. per second, the average residence time of the carbonaceous material and the primary products in the mixing section and reactor section is between 0.03 and 1.8 seconds, the temperature in the reaction section is between 350° C. and 1000° C., the rate of carbonaceous material reaction (biomass throughput) is greater than 800 lb/hr sq. ft. of reactor cross-section, the product stream liquid yield from wood or wood-derived biomass is greater than 65 wt %, the carbonaceous material is a particulate material, an atomized liquid, a vapour, or a non-condensible gas and the carbonaceous material is selected from any one of or a combination of ground wood, coal, heavy oil, petroleum derived liquids, biomass derived liquids, lignin, plastics or polymers, tires, municipal solid waste, refuse-derived fuel (RDF) and industrial residues. In a preferred embodiment, the biomass throughput is 1700-2500 lb/hr sq. ft.

The invention also provides an upflow, entrained bed, reactor for the fast-pyrolysis of carbonaceous material in the relative absence of oxygen comprising:

a) a mixing section having a first inlet means for the introduction of heat carrying inorganic particulate material and secondary inlet means for the introduction of carbonaceous material;

b) an upflow reactor section is situated above the mixing section;

c) separation means at the outlet of the reactor section to separate the gaseous and liquid pyrolysis products from the heat carrying inorganic particulate solids;

d) controlled gravity fed recirculation line between the separation means and mixing section, the controlled gravity fed recirculation line for returning the inorganic heat carrying particulate solids to the mixing section; and, e) condensing means for cooling and condensing liquid pyrolysis products after exiting the separation means.

In one embodiment of the apparatus, the invention provides that the secondary inlet means is a plurality of spaced inlets.

In a further embodiment, the invention may further comprise control means in the recirculation line for controlling the direction and rate of the flow of the inorganic particulate heat supply material, where the control means may be a control valve within the recirculation line.

In still further embodiments, the invention may include residence time control means for maintaining the total residence time of the carbonaceous material at an elevated temperature in the reactor at less than 2.0 seconds, constricting means on the recirculation line for concentrating and accelerating the heat carrying inorganic particulate solids, mixing section constriction means adjacent the mixing section for enhancing turbulence and mixing of recirculated solids and the carbonaceous feedstock, separate heat carrier heating means, the heat carrier heating means for receiving heat carrier from the recirculation line, heating the heat carrier and returning the heat carrier to the mixing section where the heat carrier heating means may be a direct contact heat exchanger.

An upflow transport reactor section above the mixer provides minimal back-mixing and ensures a very short, controlled, uniform residence time which is required for preserving non-equilibrium primary liquid, high-value gas or chemical products and minimizing secondary reactions that produce low-value equilibrium products such as char, coke, heavy tars and non-condensible gases.

A high-efficiency solids separation and recirculation system (typically a cyclone design) removes the inorganic particulate solid heat carrier and oversize solid products from the non-condensible gas and primary product vapour stream and returns the heat carrier to the mixer section in the reactor base. A control valve is positioned in the solids return line to ensure that no appreciable reverse flow occurs up the recirculation line.

The resultant process accomplishes the following:

1) extremely rapid heat transfer from the solid heat carrier to the carbonaceous reactants such that the reactants reach the desired reaction temperature in a fraction of the overall desired residence time;

2) precise control of a uniform, very short residence time such that maximum non-equilibrium yields of total liquids or selective maximum yields of individual chemicals, fuels or classes of chemicals are achieved;

3) excellent particle ablation such that undesirable secondary reactions within the reacting particle are minimized to limit production of heavy secondary tars and solid residue products (char, coke, carbon fines);

4) very limited back-mixing such that the residence time distribution is narrow and secondary reactions are minimal;

5) a controlled elevated temperature;

6) a configuration amenable to rapid product quench;

7) means for effective recycling of the hot solid heat carrier.

This configuration overcomes the residence time and heat supply constraints associated with fluidized-beds. Not only are uniform residence times below the minimum possible for a fluidized-bed achieved, but these very low residence times can readily be maintained in large commercial-scale reactors.

BRIEF DESCRIPTION OF THE DRAWINGS

These and other features of the invention will be more apparent from the following description in which reference is made to the appended drawings wherein.

DETAILED DESCRIPTION OF THE INVENTION

In the following description the corresponding elements as shown in each figure of the drawings are given the same reference number.

The major components of the upflow, entrained-bed, transport reactor fast pyrolysis system, with recirculation of the heat carrying inorganic particulate solids (hereafter referred to as the circulating-bed transport reactor system), are designed to achieve a relatively high temperature within a minimum amount of time as well as having a relatively short residence time at that temperature to effect fast pyrolysis of a carbonaceous feedstock. Rapid cooling or quenching of the products is required in order to preserve the yields of the valuable non-equilibrium products.

Figure 1:
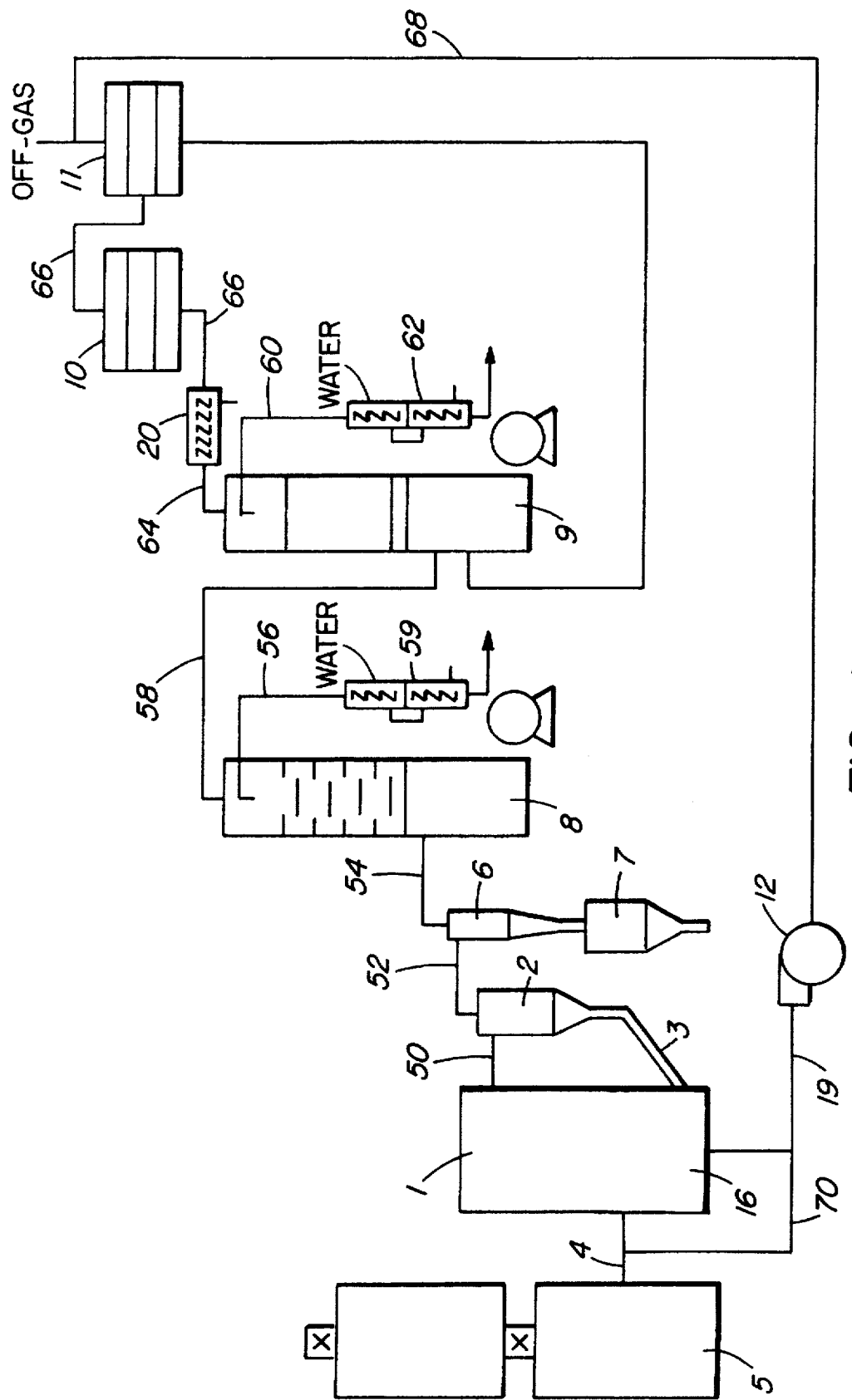
FIG. 1 is a schematic representation of a fast pyrolysis flow system for the fast pyrolysis of a carbonaceous feedstock employing the reactor of the present invention.

The major components of the fast pyrolysis apparatus, incorporating the circulating-bed transport reactor system (upflow entrained-bed transport reactor system), are illustrated in FIG. 1. These are cyclonic hot solids recirculation system (2,3), cyclonic separator (6,7), quenching system and liquid recovery (8, 9), gas recirculation and feed system (4, 5).

The heat required to drive the pyrolysis process is transferred to the mixing and reaction zones (1, 15, 16) principally by recirculated hot inorganic particulate catalytic or inert solids.

Figure 7:
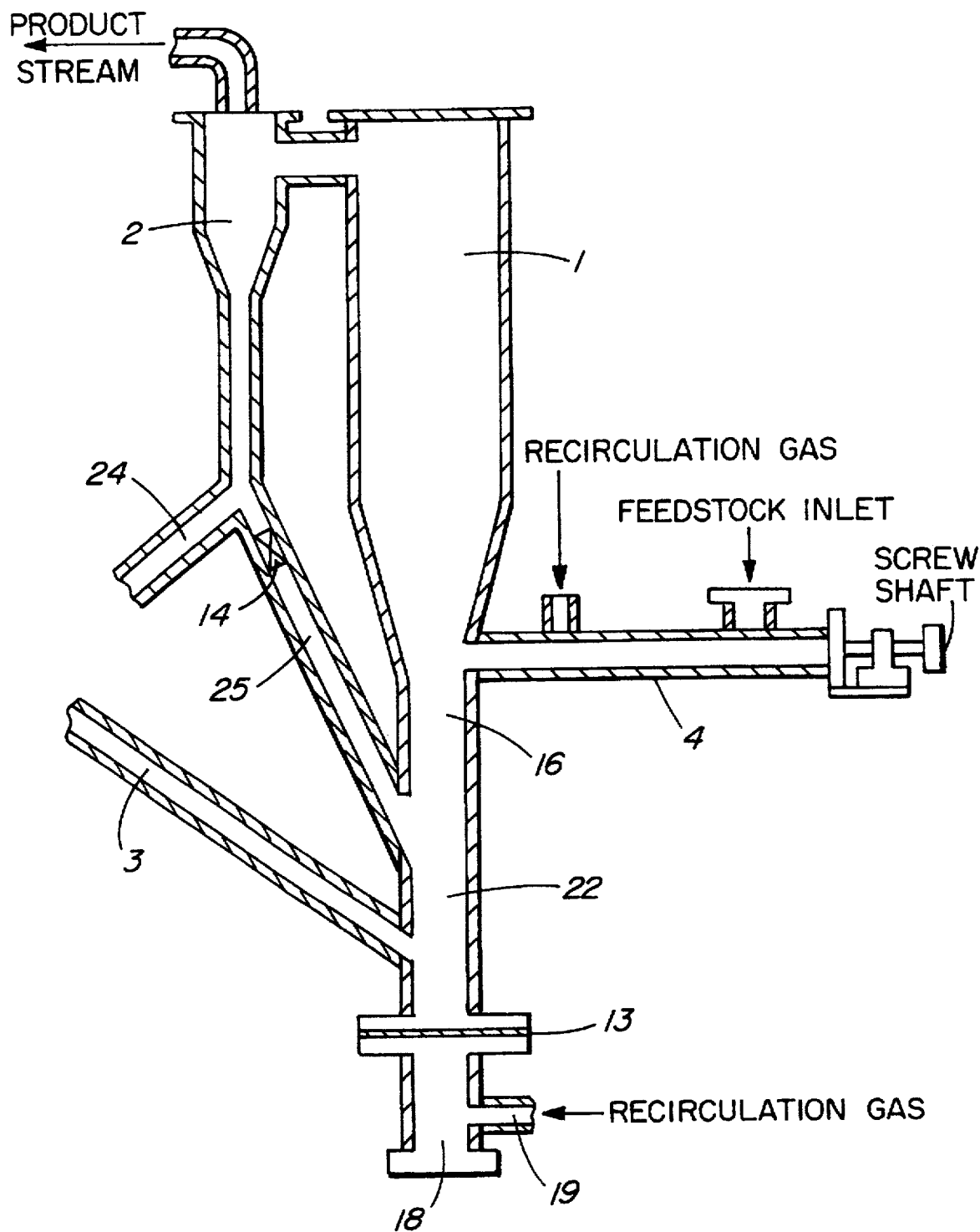
FIG. 7 is a drawing of a third alternative embodiment of the reactor.
Figure 8:
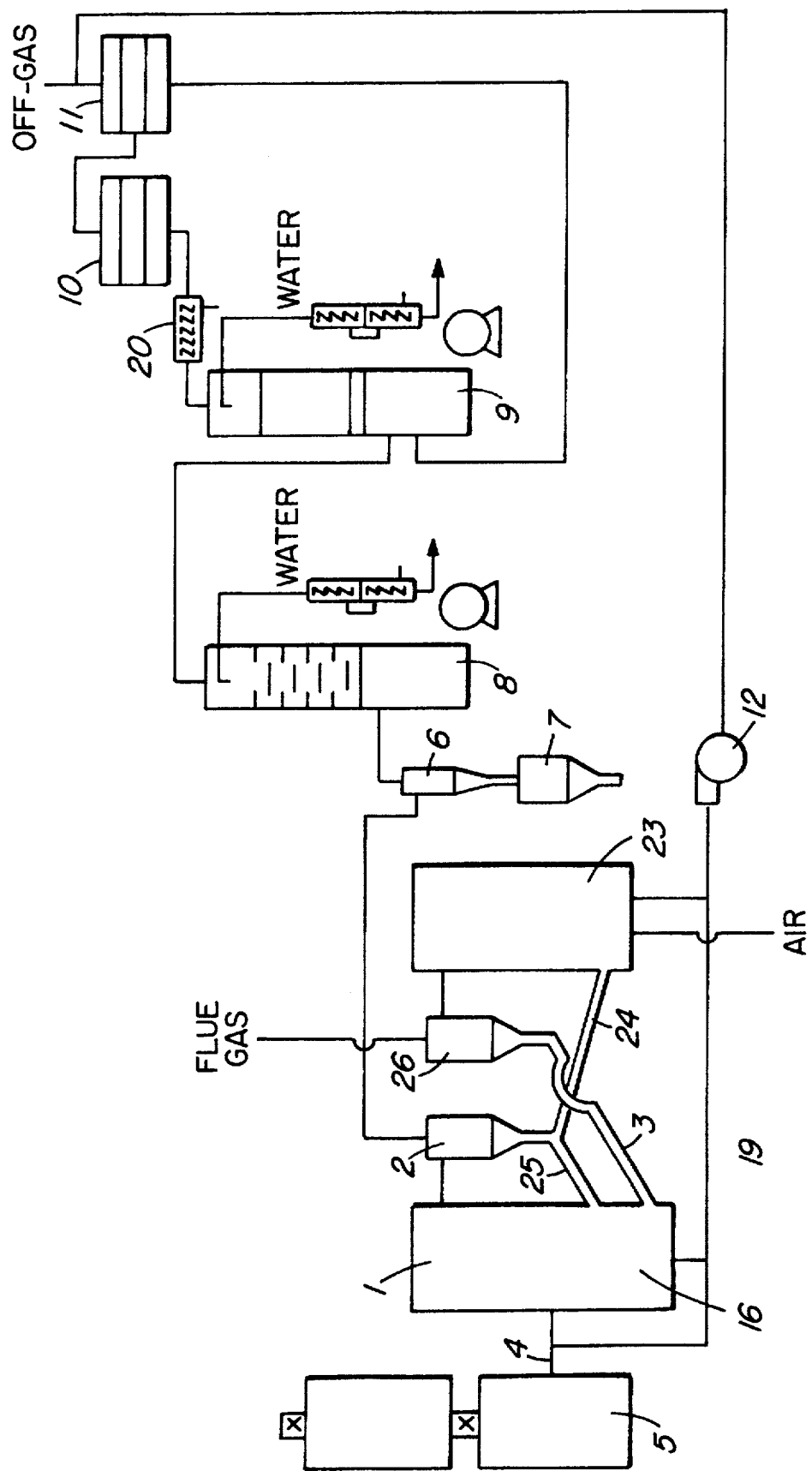
FIG. 8 is a schematic representation of a fast pyrolysis system for the fast pyrolysis of a carbonaceous feedstock employing the third alternative embodiment of the reactor of the present invention.

Typically, there is no oxidation (combustion) occurring in the mixing and reaction zones to supply direct process heat as preferably there is very little oxygen present. Direct or indirect combustion of char or gas, or externally supplied fuel, or indirect electrical resistance heating, may be employed to heat the recirculated solids before they are injected into the mixing section (16). Therefore, some small residual oxygen may be present in the mixing section (16). Direct combustion of the char may occur in the solids recirculation line (3) (outside of the mixing and reaction zones) or in a distinct and separate vessel (20) which contains an inventory of inorganic particulate catalytic or inert solids (FIGS. 7 and 8). Recirculation gas may also be combusted in this vessel. Alternatively, or as a supplement, process heat can be supplied by direct combustion of the recirculation gas in the plenum (18) or in a gas burner situated in the recirculation gas line (19). Indirect heating can be supplied by combustion of the recirculation gas or an externally-supplied fuel within fire rods, or by electrical resistance heating rods, located within the reheat zone (17).

Indirect heating of the recirculation gas has been proposed in U.S. Pat. No. 4,153,514 to Garrett, and U.S. Pat. No. 4,102,773 to Green. Garrett states that the gas stream of the carrier gas should be substantially free of oxygen, and that the stream should contain less than 4% oxygen, or preferably less than 1% oxygen. Green further states that oxygen above the stoichiometric amount can be added to the recirculating gas in order to heat the carrier, which in this case is char, to provide a source of heat for induction into the pyrolysis zone.

Rapid mixing of the inorganic particulate solid heat carrier and the carbonaceous feedstock, and heat transfer to the carbonaceous feedstock are carried out in the mixing section (16) of the transport reactor (1). In the mixing section, heat is transferred from a inorganic particulate inert or catalytic solid, and gaseous heat carrier to a carbonaceous feedstock (ie. in the form of a inorganic particulate solid, atomized particles, vapour, gas or liquid stream). Thorough mixing and rapid heat transfer typically occur within 10% of the desired overall transport reactor system residence time. Therefore, the mixing time is typically less than 0.10 seconds, and preferably within 0.015 to 0.030 seconds. The heating rate of the feedstock should be greater than 1000° C. per second.

The use of a inorganic particulate inorganic solid heat carrier as compared to a gaseous or organic heat carrier, greatly enhances heat transfer because of the higher heat carrying capacity of the solids (per unit mass), and the ability of solids to mechanically ablate the surface of the reacting carbonaceous feedstock. In addition, much higher heat transfer rates to a carbonaceous feedstock are possible using direct contact with a turbulent hot inorganic particulate solid than would be possible with indirect heat transfer through a reactor wall.

A comparison of solid heat carriers is shown in Table 2.

TABLE 2

| COMPARISON OF INORGANIC AND ORGANIC HEAT CARRIERS | | |
|---|---|---|
| | SAND/INORGANIC | CHAR/ORGANIC |
| Typical Solids Loadings (heat carrier/feed mass ratio) | 12 to 50:1 | 2–12:1 |
| Average Number of Heat Carrier Particles per Mass (lb) of Feed | 252,000,000–1,050,000,000 | 103,600–621,600 |
| Average Number of Heat Carrier Particles per Feed Particle | 5,040–21,000 | 2–12 |
| Average Number of Heat Carrier Particles per Volume (ft³) of Reactor | 4,464,000–18,600,000 | 7,200–13,300 |
| Heat Carrying Capacity. (BTU/F) of Heat Carrier per Volume (ft³) of Reactor | 0.067–0.281 | 0.041 |

Table 2 shows the improved heat carrying properties of an inorganic heat carrier over an organic heat carrier. In particular, Table 2 indicates a higher heat capacity, bulk heat carrying capacity and heat transfer surface area for an inorganic heat carrier which provides a very rapid feedstock heating rate and high surface area for reaction.

Figure 2:
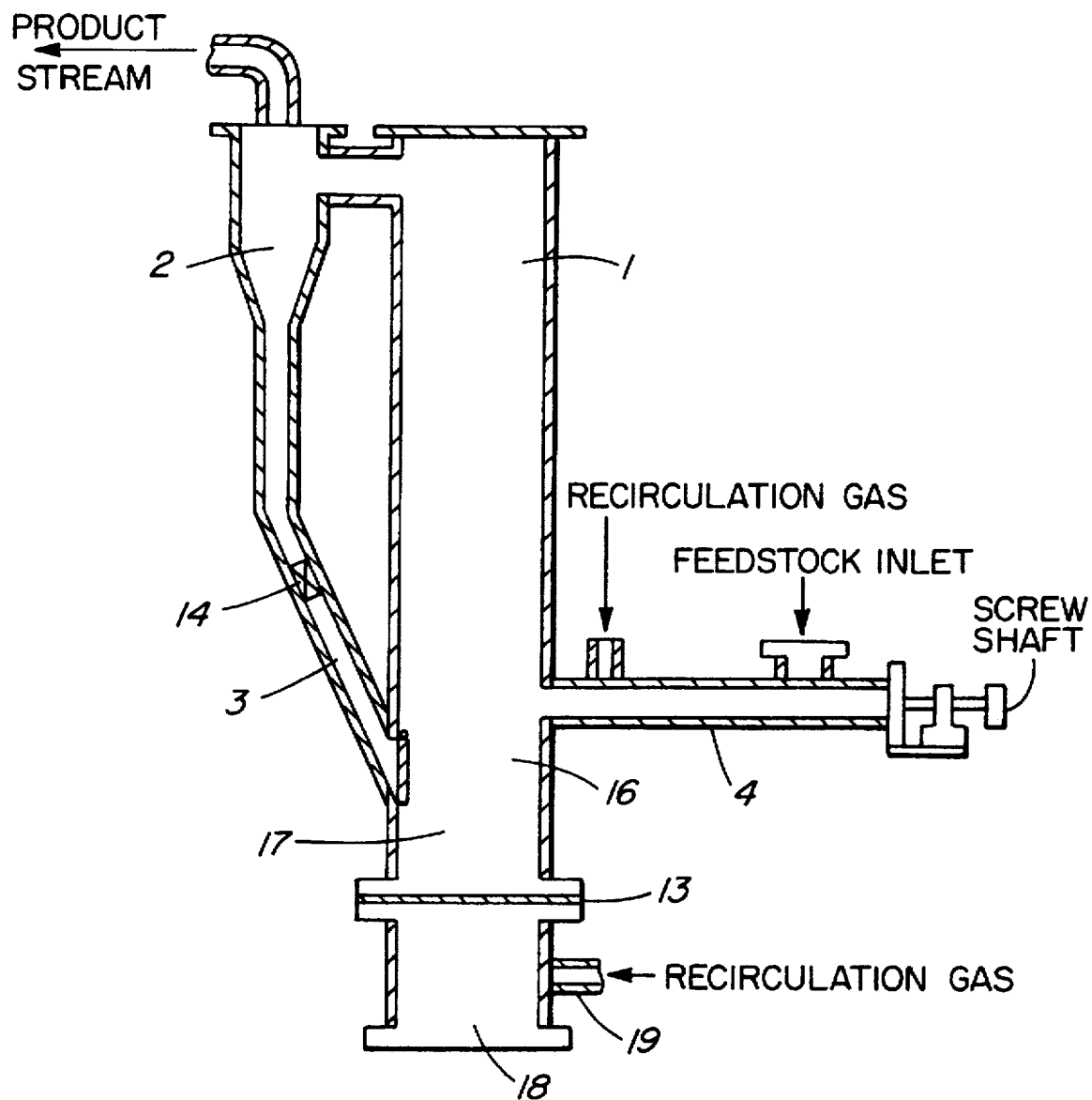
FIG. 2 is a drawing of one embodiment of the reactor of the present invention.

As shown in FIG. 2 the rapid mixing/heat transfer operations of the thermal mixer section (16) are distinct from the operation of the upflow transport reactor section (1). This allows for precise control of the total reaction residence time since the time for heat transfer/mixing is a relatively small fraction of the net residence time. The total residence time in the reactor system that is, the total time in the thermal mixing section (16) and upflow transport section (1), is typically in the range of 0.03 to 1.80 seconds.

A bubbling, fluidized bed, for example, can accomplish the requisite heat transfer, but there is very limited control of the residence time, and the residence time distribution is broad with a significant portion of the reactants remaining in the reactor for a period longer than the average residence time. In addition, the minimum residence time possible in a fluidized bed is often above the optimum residence time for maximum yields of total liquids, petrochemicals, or specific chemical products. A conventional transport or plug-flow reactor (i.e. without a mixing section), on the other hand, can offer fine control of the residence time, but the heat transfer rate is limited.

Unlike a bubbling or "dense-phase" fluidized bed, the circulating-bed transport reactor of the present invention is operated with sufficiently high superficial velocities (typically greater than 2 meters per second) such that all of the reactor material is transported out of the reactor system. Relatively little back-mixing occurs, and both the solid and vapour phase residence time distributions are narrow, that is the residence time is relatively uniform. After turbulent mixing, the operation of the transport reactor section closely resembles that of a plug-flow reactor. This feature allows precise control of the system to achieve a desired uniform average residence time.

After injection into the base of the reactor system, the fast pyrolysis of the carbonaceous feedstock is initiated in the thermal mixer (16) and continues in the transport reactor (1). The solid inorganic and gaseous heat carrier, along with the product vapours and char are carried out of the transport reactor (1) to the hot solids recirculation system (2). In this recirculation system (2), typically a reverse flow cyclone, the solids are removed from the vapour-phase stream which consists of the transport gas, non-condensible product gases and the primary condensible vapour products. The inorganic particulate solids are reheated and returned to the mixing section (16) of the reactor system via a solids recirculation line (3). Alternatively, heating of the solids can occur at the base (17) of the reactor system (i.e. below the mixing section where heat transfer rates remain high) as long as a non-combustion heat source is employed.

The exit (50) from the reactor system to the hot solids recirculation system (typically the inlet to a reverse flow cyclone) is positioned to achieve the desired minimum residence times without flooding the separation/recirculation system. This position is determined by the pressure balance as determined by the parameters of pressure, flow and physical cyclone size. The optimal height of the reactor is determined by the desired residence time, physical space constraints and selected separation efficiency.

The solids recirculation line is equipped with a flow-restriction device (14) to ensure that no appreciable quantities of inorganic particulate solid heat carrier, transport gases, product gases and vapours, or solid carbonaceous materials are blown back into the hot solids recirculation system.

The non-condensed product vapours, non-condensible product and transport gases, and solid particulate fines (52), exit from the primary hot solids recirculation system (typically a reverse-flow cyclone) to a secondary high-efficiency cyclone (6) where the char, fine ash and attributed bed materials are removed from the vapours and gases, and deposited in a solids catchpot (7). These separated solids are then removed from the char catchpot through a lock valve. Both the primary and secondary solid separation systems are heat traced to ensure that the temperature of the product stream does not fall below a specified temperature (typically the same as the reactor temperature).

The hot product stream (54) (condensible and non-condensible product) from the secondary separator (6) is immediately quenched and condensed by cooled recycled liquid (either the liquid product or some other suitable liquid solvent), in a primary condenser, typically a direct-contact condenser column (8). The condensed, warm liquid (56) is drawn from the bottom of the primary condenser by a pump (57), and transported to a heat exchanger column (59) for further cooling. The cooled liquids are then sprayed back into the top of the primary condenser column (8). Residual vapour products (58) which are not condensed in the primary column are further cooled in a secondary condenser, typically a direct-contact packed condenser column (9). Cooled, condensed liquid product (60) is drawn from the bottom of the secondary condenser column (9) and circulated through a secondary heat exchanger column (62). The gas stream (64) exiting from the top of the secondary condenser packed column (9) undergoes final cooling in a heat exchanger (20).

Persistent aerosols (organic fog) (66) which escape collection, are removed in a demister (10) and filter vessel (11) or suitable scrubbing system. A portion of the product gas stream (68) is then compressed in a gas blower (12) and recirculated to the reactor (1) to transport the feedstock, solid inorganic particulate heat carrier and products through the reactor system. Any small fraction of aerosols which are not collected by the demister and filter, may deposit in the gas recirculation blower where they are removed periodically via a solvent wash (typically sodium hydroxide).

The heat necessary for fast pyrolysis reactions is transferred to the reactants by a inorganic particulate, solid heat carrier. The heating of the heat carrier in turn, can be accomplished by several methods (and combinations of methods):

- direct heating of the heat carrier via the addition of air to the heat carrier outside of the reactor system and just prior to their re-entry into the mixing zone, thereby combusting the oversize char and carbon adhered to the surface of the solid heat carrier.
- indirect heating of the heat carrier via electrical resistance cables wrapped around the reactor system (1) and transfer lines (3).
- indirect heating of the heat carrier by heating the recirculation gas stream via external combustion of a portion of the char or gas products or other fuels in the plenum (18), gas recirculation line (19) or some other suitable external burner.
- direct heating of the heat carrier solids via electrical resistance or internally-fired heating rods submerged in the dense-phase preheat zone (17), below the mixing section (16) of the reactor system.
- direct heating via combustion or indirect heating of the heat carrier solids in a distinct and separate vessel (a direct contact heat exchanger, for example).

As stated previously, either liquid, solid or gaseous carbonaceous feedstocks can be processed in the circulating-bed transport reactor fast pyrolysis system. The feed system will vary depending on the nature of the feedstock used. The feeding of non-condensible gases or vaporized liquids is straightforward and requires no special feeding mechanism. An atomization feed system is required for liquid feedstock, while a mechanical, pneumatic or combined mechanical/pneumatic feed system is required for solids. An example of a solids feeder system is shown in FIG. 1, where a lock hopper system (5) is used to deliver a solid carbonaceous feedstock to the reactor feed screw (4). An auger in the bottom of the feed bin meters the carbonaceous material to the feeder screw, which is assisted by a carrier gas to inject the feed into the mixing section of the reactor.

A preferred circulating bed, transport reactor arrangement is shown in FIG. 2. This system utilizes the upward momentum and turbulence of the hot recirculating solid stream or streams to transfer heat to the injected carbonaceous material. Solid carbonaceous material is injected by combined mechanical/pneumatic means using a rotating screw and transport gas injected near the outlet of the reactor screw (4). The transport gas is typically a fraction (70) of the recirculated gas product. With this feeding technique, mixing and heat transfer in the mixing zone are enhanced. The addition of relatively cool recirculated product gas to the reactor screw tube, also serves to maintain the temperature of the carbonaceous feedstock at a level where no prepyrolysis can occur. Alternatively, mechanical feed systems may be selected and used which require no pneumatic flow to assist in feeding (for example, a ram plug feeder).

Figure 3:
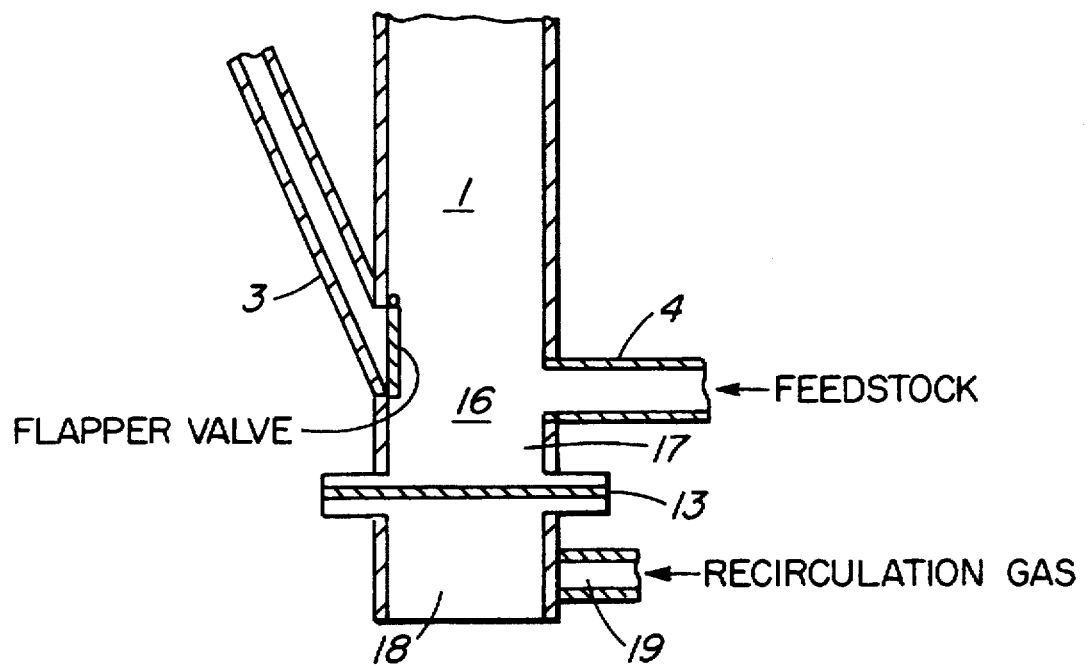
FIG. 3 is one embodiment of the mixing section of the reactor.

FIG. 3 shows one arrangement for the mixing section of the reactor. The mixing section (16) allows rapid transfer of heat from a hot inorganic particulate solid heat carrier to a solid particulate carbonaceous feedstock or an atomized liquid carbonaceous feedstock. Mixing and heat transfer typically occur within 0.10 seconds in the thermal mixer and preferably within 0.005 to 0.030 seconds. The heating rate of the feedstock should be greater than 1000° C. per second. Particle size of the carbonaceous feedstock is usually less than 6 mm for solids and typically less than 1 mm for atomized liquids. Typically, the heat carrying solids are inert silica sand or alumina-silica catalyst with a mean particle size in the range of 40 to 500 microns.

The rapid turbulent mixing/heat transfer function of the thermal mixer section (16) is distinct from the function of the transport reactor (1) in that a dense phase exists within the mixer section (16) while a dilute phase exists within the transport reactor section (1). This allows precise control of the total reaction residence time since the time for heat transfer/mixing is a relatively small fraction of the net residence time, typically less than 20% and preferably less than 10%. The total residence time in the reactor system (i.e. thermal mixer and transport reactor) is typically in the range of 0.03 to 1.80 seconds.

Solid feedstock injection is by a mechanical feeder (4), typically a screw auger, at one or several radial injection locations. Performance of the feeder can be pneumatically enhanced by injection of an inert gas, typically a portion of cooled recycle product gas. This serves to increase the entry velocity of the feedstock particles thereby achieving improved penetration into the mixing area while cooling the feedstock thereby preventing prepyrolysis. Use of the inert gas prevents product vapours from backflowing into the feedstock delivery system. The injector tubes can also incorporate air or water cooling jackets to further retard preheating of the feedstock.

The inorganic particulate heat carrier solids are introduced to the mixer section (16) by pneumatic flow through one or more entry positions in close proximity to the feedstock entry ports. The ratio of the heat carrier mass flow rate to that of the carbonaceous feedstock depends on the thermal requirements of the system which, in turn, depend on the nature of the feedstock and the desired reaction temperature. This ratio is typically between 12:1 and 200:1 and preferably in the range of 12:1 to 100:1. A flow control device, such as a flapper valve, knife valve, L-valve or J-valve, located at the solids recirculation line (3) controls the rate of solids return to the mixer while preventing the reverse flow of heat carrier solids, transport gas, product gases and vapours or solid carbonaceous material.

The transport gas, typically an inert gas or a recirculated portion of the non-condensible product gases, is introduced to the reactor via a plenum chamber (18) located below a gas distribution plate, typically a grid plate (13).

Figure 4:
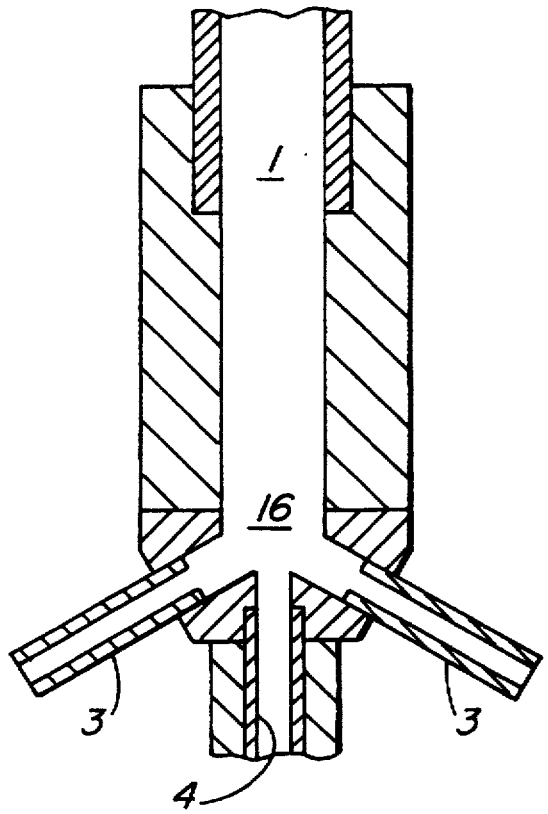
FIG. 4 is an alternative embodiment of the mixing section of the reactor.

FIG. 4 shows an alternative embodiment for the mixing section of the reactor. In this case, the mixing section of the reactor has converging inlets (3) for the solid heat carrier which is delivered from the hot solids recirculation system. The converging inlets focused on the axial carbonaceous feed inlet stream (4) and provide intimate contact and thorough mixing of the heat carrier and the feed material. This turbulence is ideal for rapid heat transfer. An angle of 60 degrees was chosen as the preferred angle for the introduction of the heat carrier jets (3) to the central carbonaceous feedstock stream (4).

Figure 5:
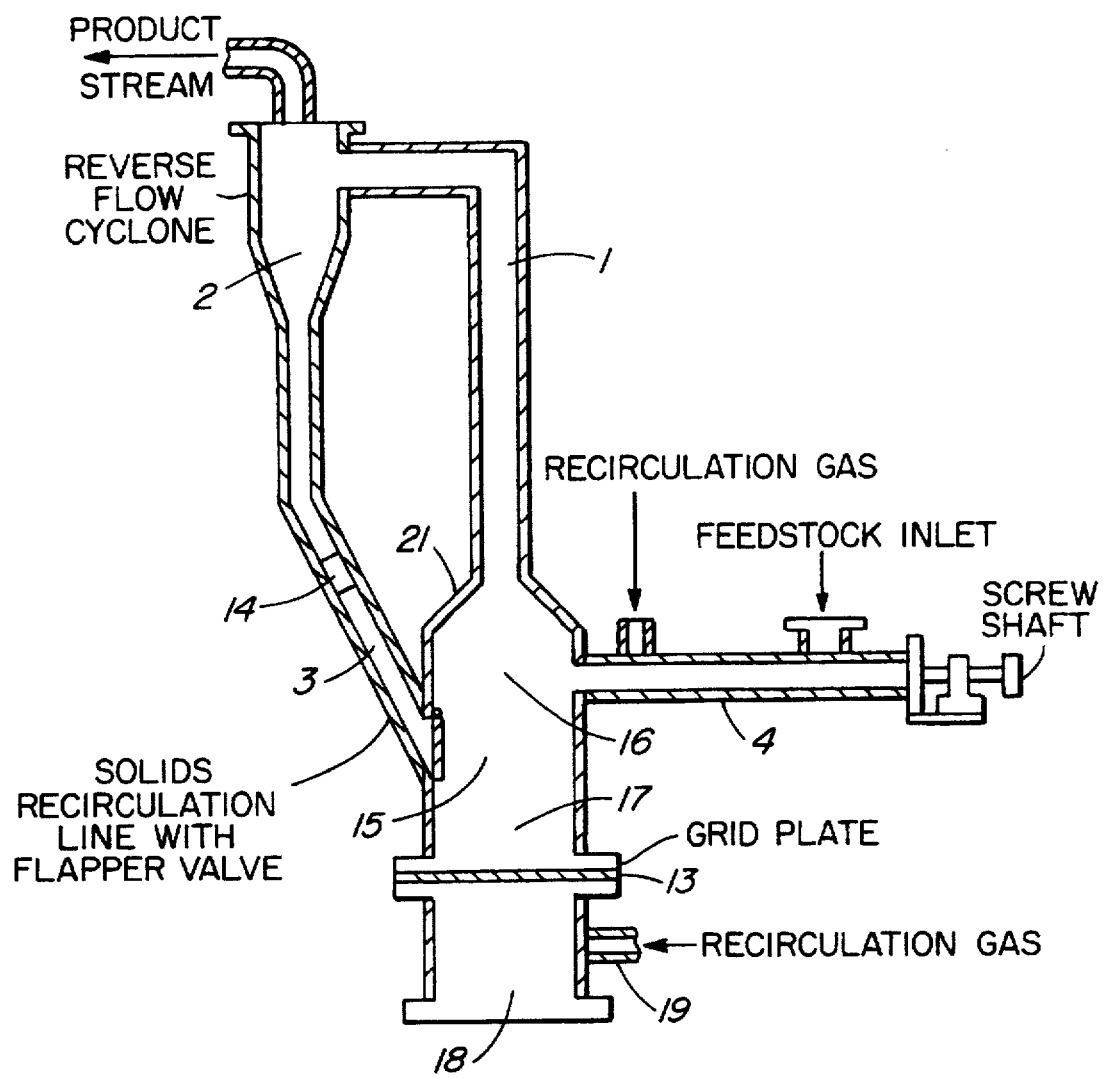
FIG. 5 is a drawing of an alternative embodiment of the reactor.

In FIG. 5 an alternative arrangement of the circulating-bed transport reactor system is illustrated. In this case, a constriction section (21) is inserted into the reactor system between the mixing section (16) and the transport reactor section (1). The constriction angle is typically 25 to 60 degrees preferably 40 to 50 degrees. The constriction enhances the mixing and heat transfer characteristics of the system further, and combined with the corresponding reduction in transport section diameter (i.e. reduced reactor volume), allows operation at greatly reduced residence times below 0.10 seconds, if required.

Figure 6:
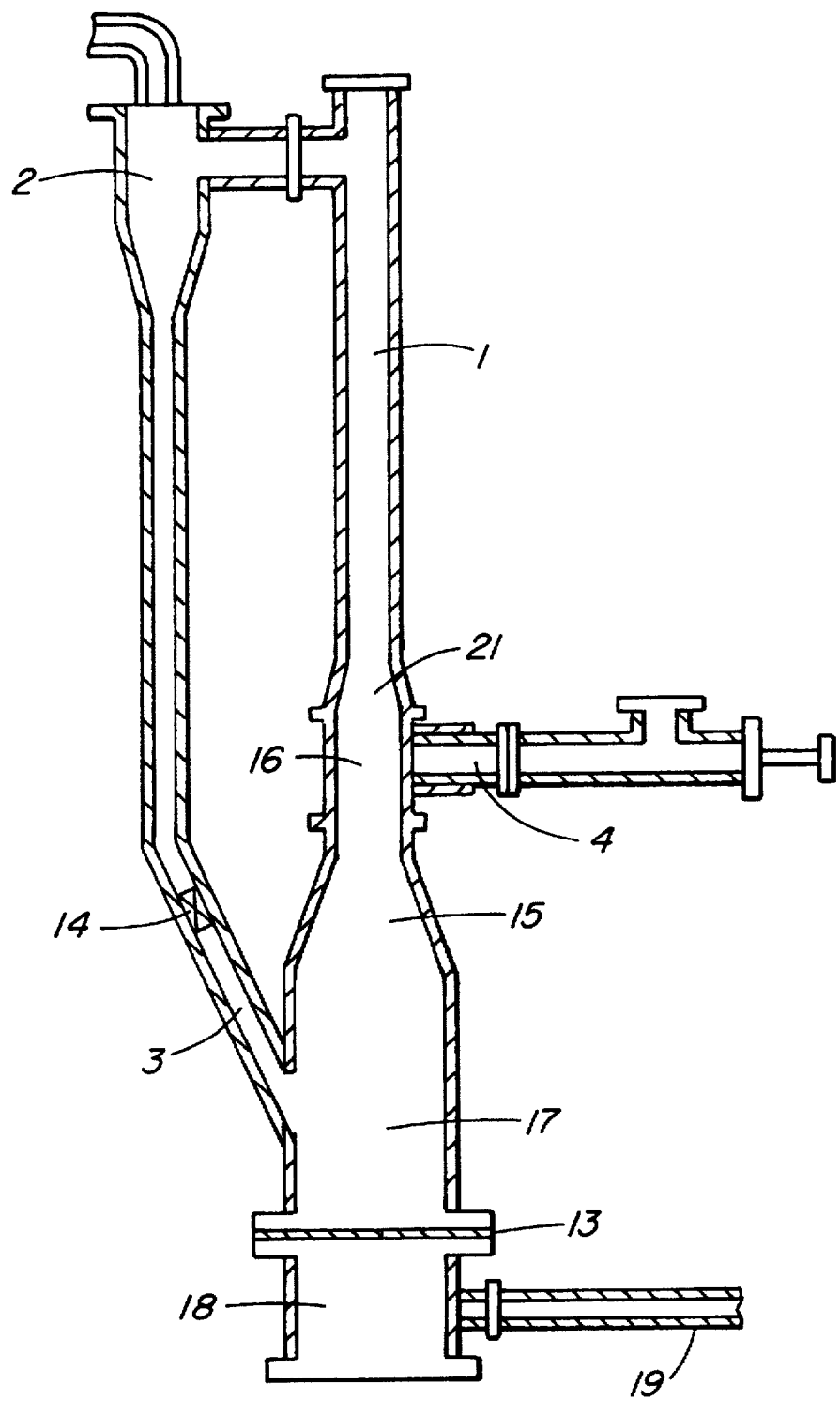
FIG. 6 is a drawing of a second alternative embodiment of the reactor.

In FIG. 6, a second alternative embodiment of the reactor is illustrated with the addition of a second constriction section (15) between a reheat zone (17) and the mixing section (16). This second constriction serves to further accelerate and concentrate the hot solid stream which in turn further enhances mixing and heat transfer in the mixing zone (16).

In FIG. 7, a third alternative embodiment of the circulating bed transport reactor system is illustrated. In this embodiment, a constriction section (22) is inserted into the reactor in the region where recirculated solids enter the reactor system from the solids recirculation line (3). This constriction accelerates the solids, increases turbulence and enhances mixing between recirculated solids and carbonaceous feedstock.

FIG. 7 also represents an embodiment of the invention where the reactor system is modified so that heat can be supplied to the inorganic particulate catalytic or inert solids via direct combustion or indirect heating in a distinct and separate vessel (23) such as a direct contact heat exchanger as illustrated in FIG. 8. This concept is equally applicable to the embodiments of the invention as illustrated in FIGS. 2, 5 and 6. In this embodiment, hot solids are returned from the separate vessel (23) to the reactor system via a solids recirculation line (3). Solids are delivered to this vessel (23) for heat addition via a solids transfer line (24) following separation from the products in the solids recirculation system (2). A second solids transfer line (25) from the solids recirculation system (2) leading to the reactor mixing zone (16) or acceleration zone (22) may be added for temperature or solids flow control. This control is effected by means of a control valve (14).

The major components of the fast pyrolysis apparatus incorporating the circulating bed transport reactor system (1, 2, 3, 16) and the distinct heat supply vessel (23, 24, 26) or direct heat exchanger are illustrated in FIG. 8.

EXAMPLES

The circulating bed transport reactor of the present invention was run with the feedstocks set out below, and at the reaction temperatures indicated. The total liquid yields and gas yields produced were indicated and in addition a browning index of 5.5 was achieved. The browning index is a relative measure of the ability of carbonaceous materials to react with the amino acid glycine. The browning index provides a good correlation of a solution of pyrolysis liquid to function as a smoke flavouring solution, as well as to indicate the extent of brown colour formation on food surfaces and it is known to those in the smoke flavouring industry.

Example 1

The reactor used in this example was an upflow recirculating transported be reactor having a 6" diameter and 30 kg/h processing rate.

Feedstock
wood (hardwood)
Carbon Content: 48.5%
Hydrogen Content: 6.2%
Oxygen Content: 44.2%
Ash Content: 0.6%
particle size: less than 0.25"
Heat Carrier
sand
250 μm diameter
Operating Conditions
Reactor Temperature 520° C.
Loading ratio: 20:1
Residence Time 0.69 s
Run Time 12.0 hours
Product Yields
Total Liquid Yield: 72.5%
Gas Yield: 13.0%
Char Yield: 14%
Relative Browning Index: 5.5
Product Properties:

| Physical Properties | Typical Value |
| --- | --- |
| Moisture Content | 24% |
| pH | 3.0 |
| Specific Gravity | 1.19 |
| Elemental (moisture free) | |
| C | 56.4% |
| H | 5.6% |
| N | 0.17% |
| S | 0.0005% |
| Ash | 0.15% |
| HHV (moisture free) | 23 MJ/kg |
| Viscosity (@ 40° C.) | 51 cp |
| Kinematic Viscosity | |
| @ 25° C. | 233 cSt |
| @ 40° C. | 134 cSt |

By way of comparison at 520° C., the fast pyrolysis system of the present invention provided a relative browning index 5.5 times higher, a total liquid yield of about 2.4 times higher and a char yield 56% lower than conventional slow pyrolysis. In addition, the slow pyrolysis hardwood-derived liquid product is a relatively low-value secondary tar (ie. made up of constituents which have repolymerized and recondensed to form longer chain heavy compounds). This slow pyrolysis liquid is extremely viscous and very difficult to pour at room temperature. On the other hand, the fast pyrolysis liquid produced in Example 1 is made up of valuable, light components which are completely different from slow pyrolysis liquids with respect to their chemical composition and value. Fast pyrolysis liquids derived from hardwoods are very non-viscous and readily pour at room temperature.

Example 2

The reactor used in this example was an upflow recirculating transported be reactor having a 6" diameter and 30 kg/h processing rate.

Feedstock
wood (hardwood)
Carbon Content: 48.5%
Hydrogen Content: 6.2%
Oxygen Content: 44.2%
Ash Content: 0.6%
particle size: less than 0.25"
Heat Carrier
sand
250 μm diameter
Operating Conditions
Reactor Temperature 500° C.
Loading ratio: 20:1
Residence Time 1.4 s
Run Time 15.0 hours
Product Yields
Total Liquid Yield: 70%
Gas Yield: 19%
Char Yield: 11%
Relative Browning Index: 3.5
Product Properties:

| Physical Properties | Typical Value |
| --- | --- |
| Moisture Content | 24% |
| pH | 3.0 |
| Specific Gravity | 1.19 |
| Elemental (moisture free) | |
| C | 56.4% |
| H | 5.6% |
| N | 0.17% |
| S | 0.0005% |
| Ash | 0.15% |
| HHV (moisture free) | 23 MJ/kg |
| Viscosity (@ 40° C.) | 51 cp |
| Kinematic Viscosity | |
| @ 25° C. | 233 cSt |
| @ 40° C. | 134 cSt |

By way of comparison at 500° C. using conventional slow pyrolysis, the relative browning index was 3.5 times higher, the total liquid yield was about 2.3 times higher and the char yield was 42% lower when the present invention was used for the fast pyrolysis of hardwood. As was the case in Example 1, the slow pyrolysis hardwood-derived liquid product was relatively low-value secondary tar. On the other hand, the fast pyrolysis liquid produced in Example 2 consists of valuable, light components which are completely different from slow pyrolysis liquids with respect to their chemical composition and value.

Example 3

The reactor used in this example was an upflow recirculating transported be reactor having a 6" diameter and 30 kg/h processing rate.

Feedstock lignin

Carbon Content: 63.32%

Hydrogen Content: 6.08%

Oxygen Content: 33.35%

Nitrogen Content: 0.27% particle size: less than 250 μm

Heat Carrier sand

250 μm diameter

Operating Conditions

Reactor Temperature 550° C.

Loading ratio: 20:1

Residence Time 0.8 s

Run Time 1 hour

Product Yields

Total Liquid Yield: 55%

Gas Yield: 10%

Char Yield: 35%

Relative Browning Index: 5.5

Product Properties:

| Physical Properties | Typical Value |
|---|---|
| Moisture Content | 18% |
| Ash Content | 0.3% |
| Elemental (moisture free) | |
| C | 67.0% |
| H | 6.9% |
| N | 0.1% |
| O | 26.0% |
| Average Molecular Weight | 654 |
| HHV (moisture free) | 27.8 MJ/kg |

Example 4

The reactor used in this example was an upflow recirculating transported be reactor having a 6" diameter and 30 kg/h processing rate.

Feedstock wood (hardwood)

Carbon Content: 48.5%

Hydrogen Content: 6.2%

Oxygen Content: 44.2%

Ash Content: 0.6% particle size: less than 0.25"

Heat Carrier sand

250 μm diameter

Operating Conditions

Reactor Temperature 520° C.

Loading ratio: 20:1

Residence Time 0.33 s

Run Time 5.0 hours

Product Yields

Total Liquid Yield: 78%

Gas Yield: 11.1%

Char Yield: 10.9%

Relative Browning Index: 6.0

By way of comparison with slow pyrolysis, the relative browning index was about 6 times higher, the total liquid yield was about 2.6 times higher and the char yield was 67% lower when the present invention was used for the fast pyrolysis of hardwood at 520° C. As was the case in Example 1, the slow pyrolysis hardwood-derived liquid product was a relatively low-value secondary tar. On the other hand, the fast pyrolysis liquid produced in Example 4 consists of valuable, light components which are completely different from slow pyrolysis liquids with respect to their chemical composition and value.

Further studies indicate the advantages of the present invention with respect to liquid yields and system capacity over the prior art. The following runs were performed utilizing the apparatus of the present invention to compare the use of an inorganic heat particulate source to the use of char. When char was used in the apparatus of the present invention at 521° C. and about 0.3 seconds residence time, a liquid yield of 55% was achieved.

A problem, however, quickly develops with the use of char at high loading ratios wherein a high char loading ratio leads to plugging of the reactor and, hence, a maximum feedstock throughput for a particular heat carrier.

The typical maximum capacity for a reactor expressed in lb/hr sq.ft. is set out in Table 3.

TABLE 3

Typical Maximum Feedstock Throughput as a Function of Heat Carrier

| Heat Carrier | Feedstock Throughput (lb/hr-ft$^{2*}$) |
|---|---|
| Sand | 2500 |
| Char | 800 |
| Gas | 100 |

*These units represent the amount of biomass that the pyrolysis system can process per hour per square foot of reactor cross-section.

Table 3 clearly indicates the unexpected result that the reactor system capacity is drastically reduced as the heat carrier is changed from an inorganic solid to char to a non-solid heat carrier. If maximum throughput is exceeded for a given heat carrier, plugging occurs resulting in insufficient heat transfer and ablation. Table 3 further indicates that the use of an inorganic heat carrier for a given system results in a significant increase in heat transfer, ablation efficiency and system economics whereas the organic and non-solid heat carriers are inferior. The density difference between sand, char and gas (sand has the highest density, gas the lowest) results in a significantly smaller volume of heat carrier being used to carry a given amount of heat to the biomass in the reactor when compared with heat carrier volume of char or gas. The smaller volume of heat carrier results in a smaller reactor system for a given biomass throughput which will lower capital and operating costs of the system.

Example 5

Test equipment was used to carry out several experimental runs with a biomass feedstock, using different heat carriers (sand, char and gas) at various solids loadings and throughput.

The system has a nominal rating for biomass feedstocks (eg. hardwood) of 10 lb/hr. Electrical resistance heaters are utilized to provide process heat. The system comprises the following components:

- a 1-inch nominal diameter upflow transport reactor;
- a 1-inch heat carrier screw auger to meter the heat carrier solids from the reheat vessel;
- a ¾ inch nominal diameter upflow acceleration zone to accelerate the metered heat carrier solids to the proper transport velocity using preheated nitrogen carrier gas;
- a mixing zone to provide good initial contact between the heat carrier solids and feedstock;
- a reverse flow cyclone to separate the solids from the reacting vapour stream;
- a reheat vessel to reheat the heat carrier solids;
- a 1-inch feedstock screw auger to meter the biomass feedstock from the biomass feed bin;
- a series of 3 surface condensers to condense and collect the liquid product.

Method
Operation of the system was continuous, as follows:

1. Preheated heat carrier solids were metered from the reheat vessel to the upflow acceleration zone by the heat carrier screw auger;
2. The heat carrier solids were then accelerated in the upflow acceleration zone to the mixing zone using a preheated nitrogen carrier gas stream;
3. The biomass feedstock was metered from the biomass feed bin to the mixing zone by the feedstock screw auger;
4. The biomass feedstock contacted the heat carrier solids in the mixing zone where the reaction was initiated;
5. The reaction continued in the upflow transport reactor;
6. The product vapour was separated from the solids in the reacting stream by the reverse flow cyclone. A portion of the fine char particles remained with the reacting product vapour, and a portion was recycled with the heat carrier;
7. The solids were returned to the heat vessel where they were reheated, then used again in the cycle described in steps 1–6.

In addition, the reacting product vapour was quenched by a stream of cold nitrogen gas at the exit of the reverse flow cyclone;

the quenched product vapours were condensed to a liquid product in the surface condensers. The liquid yield was determined by the mass gain of the surface condensers;

product gases at the exit of the surface condensers were passed through an orifice meter, collected in a gas sampling bag, and analyzed by GC. Gas yield was determined from the total mass flow obtained by orifice meter measurements and analysis of individual gas components by GC;

char was collected by a high efficiency cyclone placed between the reverse flow cyclone (at the upflow transport reactor exit) and the surface condensers, and with the heat carrier. The char yield was determined by ash analysis of the collected samples when sand was used as the heat carrier. When char was used as the heat carrier, the char yield was determined as the total weight gain of char in the system.

Results and Observations

Table 4 summarizes the results obtained from eight (8) experimental runs carried out in the test equipment. Runs were conducted with sand and char solid heat carriers, as well as with no solid heat carrier (ie. gas only). Solids loadings (mass ratio of heat carrier-to-biomass feedrates) were varied between 12 and 21:1. Biomass throughput of 800 and 1500 lb/hr/sq.ft were utilized (ie. 5 lb/hr and 9 lb/hr, respectively). The following results were obtained:

TABLE 4

Summary of Experimental Runs.

| Run # | R-16 | R-18 | R-19 | R-20 | R-10 | R-21+ | R-22+ | R-23++ |
|---|---|---|---|---|---|---|---|---|
| Heat Carrier Type | Sand | Sand | Sand | Sand | Char | Char | Char | Gas Only |
| Solids Loading (wt/wt) | 12:1 | 16:1 | 20:1 | 21:1 | 12:1 | 12:1 | 12:1 | — |
| Biomass Feedrate (lb/hr) | 9.4 | 9.1 | 9.1 | 4.9 | 4.9 | 9.4 | 9.4 | 4.9 |
| Heat Carrier Feedrate (lb/hr) | 113 | 142 | 187 | 103 | 58 | 113 | 113 | 0 |
| Heat Carrier Throughput (lb of heat carrier/hr/sq.ft) | 18778 | 23693 | 31141 | 17162 | 9617 | 18778 | 18778 | 0 |
| Biomass Throughput | 1566 | 1516 | 1516 | 816 | 816 | 1516 | 1516 | 816 |
| Temperature (°C.) | 548 | 520 | 512 | 519 | 521 | 520 | 520 | 520 |
| Residence Time (sec) | 0.3 | 0.3 | 0.3 | 0.3 | 0.3 | 0.3 | 0.3 | 0.3 |
| Product Yields (wt %) | | | | | | | | |
| Liquid | 65.8 | 70.9 | 72.5 | 72.5 | 54.8 | — | — | — |
| Gas | 23.0 | 14.1 | 15.9 | 16.3 | 25.1 | — | — | — |
| Char | 11.2 | 15.0 | 11.6 | 11.2 | 20.1 | — | — | — |

+Run Aborted: char plugged transport lines.
++Run Aborted: biomass plugged reactor.

Figure 9:
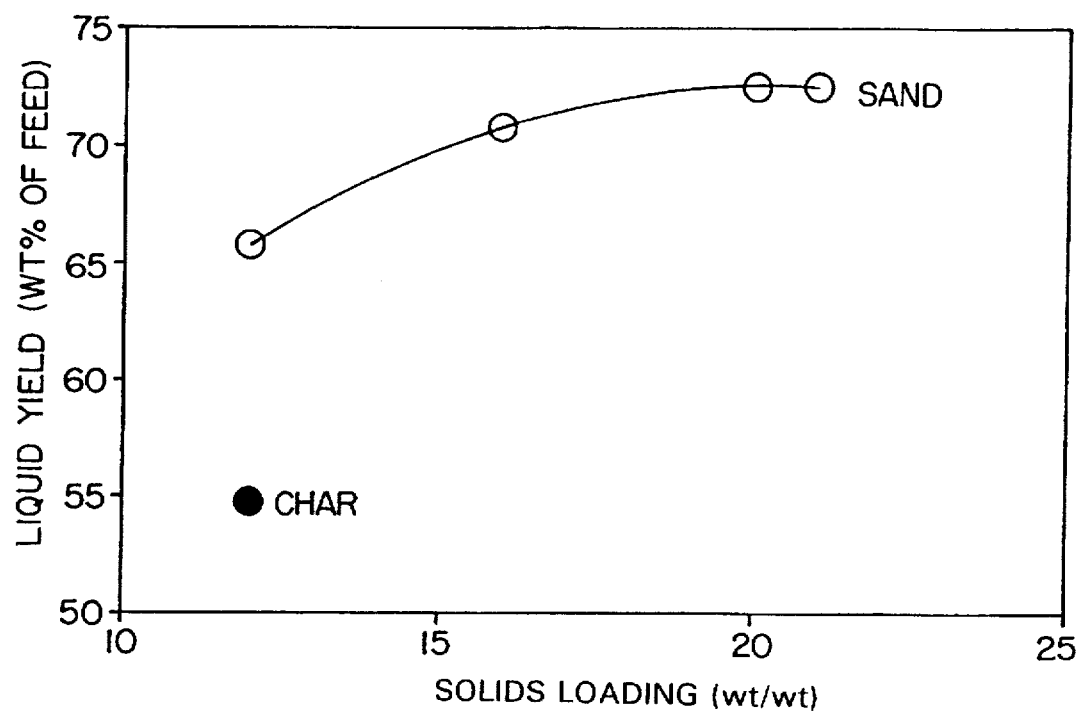
FIG. 9 shows a comparison of the liquid yield vs. solids loading of an inorganic heat carrier and organic heat carrier.

Sand heat carrier:

Liquid yield increased with higher solids loading, from 65.8 wt % at 12:1 to 72.5 wt % at 20:1 (constant biomass throughput of about 1500 lb/hr/sq.ft);

Liquid yield was retained at 72.5 wt % when the biomass throughput was derated to 800 lb/hr/sq.ft (constant solids loading of about 20:1);

Above a solids loading of about 18:1 the liquid yield reached a plateau (FIG. 9). Solids loadings above this did not result in significantly higher liquid yields.

Char heat carrier:

It was not possible to complete an experimental run using char as the heat carrier at the rated capacity (ie. a biomass throughput of 1500 lb/hr/sq.ft or 9 lb/hr), even at a solids loading of 12:1. Two attempts were made (R-21 and R-22) The char plugged the transport lines in both runs;

The biomass throughput had to be derated to 800 lb/hr/sq.ft (5 lb/hr) at a solids loading of 12:1 to allow the completion of an experimental run using char as the heat carrier;

The liquid yield obtained at the derated biomass throughput of 800 lbs/hr/sq.ft (5 lb/hr) was very low at 54.8 wt % (FIG. 9);

Higher char yield was obtained using the char compared to sand heat carrier (20.1 vs 11.2 wt %, an almost two fold difference);

Higher gas yield was obtained using the char compared to sand heat carrier (about 25 vs 16 wt %).

Gas only as heat carrier:

It was not possible to complete an experimental run using gas only as the heat carrier even at a derated biomass throughput of 800 lb/hr/sq.ft (5 lb/hr). Run R-23 was aborted due to the biomass plugging the rector within the first two minutes of the run.

The following qualitative observations were made:

The data in Table 4 and FIG. 9 clearly indicate that a significant difference exists when comparing sand heat carrier experiments with char and gas heat carrier experiments. It is important to note that because of wall effects in laboratory-scale equipment, these are "best case" results for char and gas heat carriers. In other words, the differences would be even greater in large commercial scale equipment. For example, the derating of the system from about 9 kg/hr using sand as the heat carrier to 0.7 lb/h using no particulate solids (ie. gas only) illustrates (Table 4) that the wall effects contribute about 8% of the required heat (0.7/9). In a large commercial reaction vessel, the wall effects are practically insignificant, and the system derating would be much greater. The differences between sand heat carrier runs and char or hot gas heat carrier runs would therefore increase dramatically in commercial operations;

the use of char as the heat carrier results in a high char yield;

Significant derating of the biomass throughput would be required to operate with gas only as the heat carrier;

When char is recirculated as the heat carrier, the attrition rate of the char is significantly higher compared to sand. Therefore, high char make-up is required in the reactor loop to maintain an adequate inventory in continuous operation;

Differences in bulk density between the char and sand (10 vs 100 lb/cu.ft) means that significantly higher volumes of char are required for a given heat carrier throughput. For a biomass throughput of 1500 lb/hr/sq.ft, operation of the test equipment is not possible even at a solids loading as low as 12:1. The high volume of char plugs the transport lines (ie. solids acceleration zone). A significant derating of the biomass throughput would be required to achieve operation at a solids loading of about 20:1 with char as the heat carrier.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

The embodiments of the invention in which an exclusive property or privilege is claimed are defined as follows:

1. A process for the rapid thermal processing of carbonaceous material in an upflow transport reactor, the reactor having a mixing section and a reactor section, said process comprising the steps of:

a) introducing a primary stream of carbonaceous material and a secondary stream of inorganic particulate heat carrier into the mixing section in the relative absence of oxygen, such that an average number of particles of said heat carrier within the mixing and reactor section is between about $4.5 \times 10^6$ and $18.6 \times 10^6$ particles per $ft^3$ of reactor volume;

b) maintaining the stream of carbonaceous material in contact with the secondary stream of heat carrier through the reactor section to cause transformation of the carbonaceous material to a product stream;

c) separating the product stream from the heat carrier by separation means at the exit of the reactor section such that the average residence time of contact between the carbonaceous material and the heat carrier is less than 2.0 seconds and the temperature of the products is reduced after exiting from the reactor section to less than 300° C. in less than 0.1 second; and d) recycling the heat carrier to the mixing section.

2. The process as in claim 1 wherein the inorganic particulate heat supplying material is sand, sand and catalytic solids, or alumina-silica catalyst.

3. The process as in claim 2 wherein the ratio of the mass of inorganic heat supplying material:mass of carbonaceous feedstock is between 12:1 and 200:1.

4. The process as in claim 3 wherein the heating rate of the carbonaceous material in the mixing section and reactor section is greater than 1000° C. per second.

5. The process as in claim 4 wherein the average residence time of the carbonaceous material and the primary products in the mixing section and reactor section is between 0.05 and 0.90 seconds.

6. The process as in claim 5 wherein the temperature in the reactor section is between 350° C. and 1000° C.

7. The process as in claim 6 wherein the rate of carbonaceous material reaction is greater than 800 lb/hr sq. ft.

8. The process as in claim 7 wherein the yield of liquids in the product stream is greater than 65 wt %.

9. The process as in claim 8 wherein the carbonaceous material is a particulate material, an atomized liquid, a vapour, or a non-condensible gas.

10. The process as in claim 9 wherein the carbonaceous material is selected from any one of or a combination of ground wood, coal, heavy oil, petroleum liquids, biomass liquids, lignin, plastics or polymers, tires, municipal solid waste, biomass refuse, fuel oil and industrial residues.

11. The process as in claim 1 wherein the ratio of the mass of inorganic heat supplying material:mass of carbonaceous feedstock is between 12:1 and 200:1.

12. The process as in claim 1 wherein the heating rate of the carbonaceous material in the mixing section and reactor section is greater than 1000° C. per second.

13. The process as in claim 1 wherein the average residence time of the carbonaceous material and the primary products in the mixing section and reactor section is between 0.05 and 0.90 seconds.

14. The process as in claim 1 wherein the temperature in the reactor section is between 350° C. and 1000° C.

15. The process as in claim 1 wherein the rate of carbonaceous material reaction is greater than 800 lb/hr sq. ft.

16. The process as in claim 1 wherein the yield of liquids in the product stream is greater than 65 wt %.

17. The process as in claim 1 wherein the carbonaceous material is a particulate material, an atomized liquid, a vapour, or a non-condensible gas.

18. The process as in claim 1 wherein the carbonaceous material is selected from any one of or a combination of ground wood, coal, heavy oil, petroleum liquids, biomass liquids, lignin, plastics or polymers, tires, municipal solid waste, biomass refuse, fuel oil and industrial residues.

19. The process as in claim 1 wherein the rate of carbonaceous material reaction is 1500–2500 lb/hr sq. ft.

20. The process of claim 1 wherein the heat carrier is present in an amount of between about $2.52 \times 10^8$ and $10.5 \times 10^8$ particles per pound of feedstock.

21. The process of claim 1 wherein the inorganic heat carrier comprises a heat capacity of between about 0.067 and 0.281 BTU/F/ft$^3$.

22. The process of claim 1 wherein the feedstock is a solid and the inorganic heat carrier is provided so that there are between about 5,040 and 21,000 heat supplying particles per feed particle.

23. The process of claim 1 wherein the ratio of the mass of inorganic particulate heat carrier to mass of carbonaceous feedstock is greater than 12 to 1.

24. The process of claim 1 wherein the inorganic particulate heat carrier is a non-alkali material.

* * * * *